Inventor
Robert H. Smith

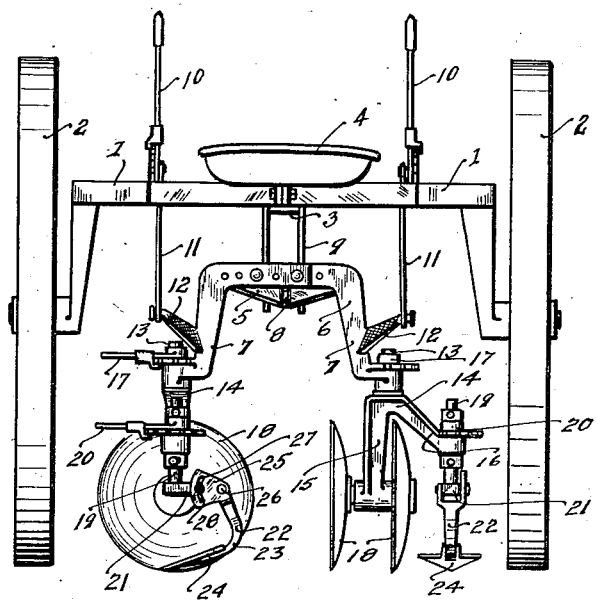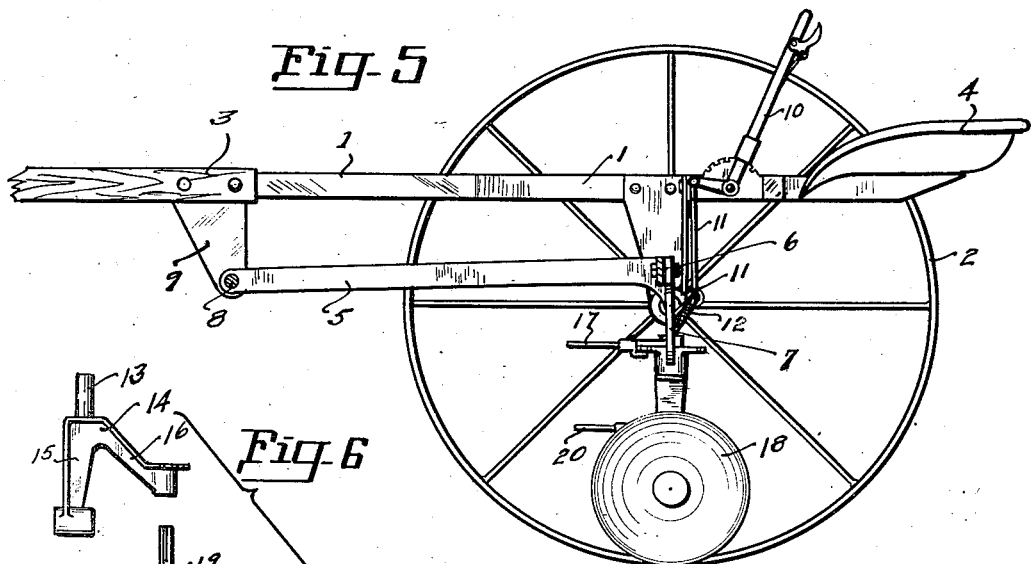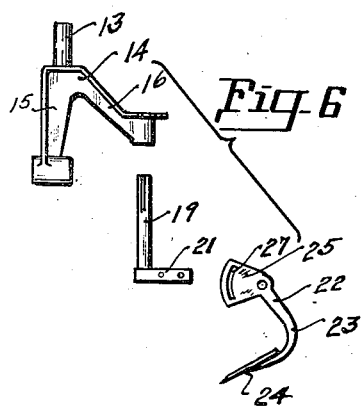

Patented Sept. 1, 1936

2,052,807

UNITED STATES PATENT OFFICE 2,052,807

COMBINATION DISK AND SHOVEL CULTIVATOR

Robert H. Smith, Salem, Oreg.

Application April 2, 1935, Serial No. 14,239

3 Claims. (Cl. 97—54)

The present invention relates to improvements in agricultural implements suitable for cultivating field crops, such as corn. The principal object of the invention being to provide an implement suitable for mulching the soil, killing weeds and distributing earth to and from the crops as the occasion may require.

The invention in its present embodiment is of the straddle type which operates each side of a row of growing crop simultaneously. In its preferred embodiment it embraces a combination of rotatable disks and shovels or scarifiers operating simultaneously. These implements are so arranged that their positions relative to the crop row may be changed or altered. That is to say, the implement may operate with the shovels or scarifiers next to the growing plants and the disks outwardly therefrom, or the disks may operate proximate the plants with the shovels or scarifiers outwardly therefrom.

Among the results obtained may be enumerated the following. The weeds may be cut next the crop row, the earth removed therefrom, earth moved to the crop row, the earth leveled between the crop rows, the earth broken up proximate and remote from the crop row, and other manipulations in accordance with the requirement of the time.

A more complete understanding of the operation, together with the construction thereof and additional objects will be attained upon reading the following description of the invention, aided by the drawings wherein:—

Figure 4 is a rear elevation of the invention.

Figure 5 is a side sectional view of the invention.

Figure 6 is a detached elevation of certain of the principal elements composing the invention. This view is intended to show the relationship between the elements as well as to illustrate their individual construction.

In the drawings:

Figure 1:
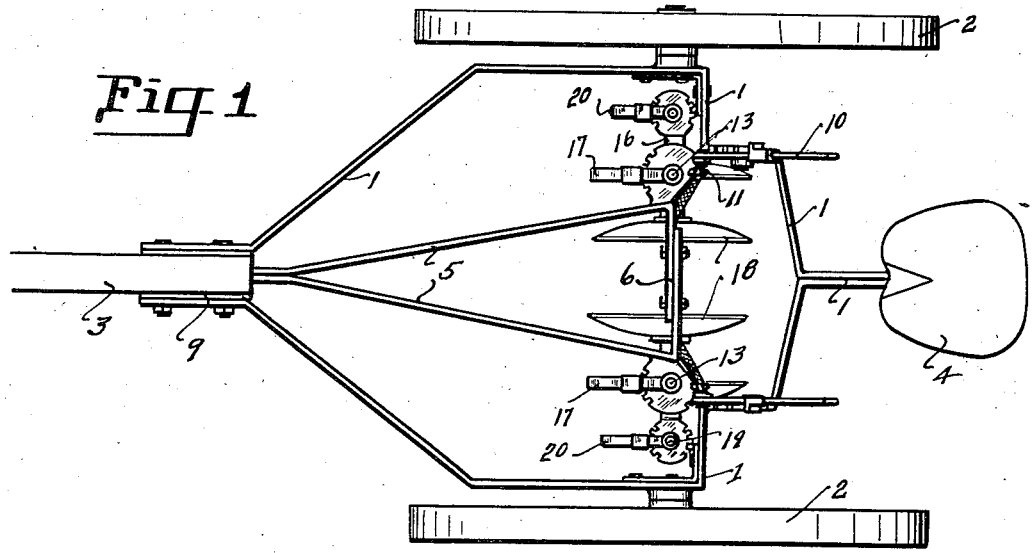
Figure 1 is a plan view of the invention.

1 indicates a wheeled frame of the straddling type provided with ground wheels 2 and a tongue 3 for draft, also a seat 4 for the driver thereof. The foregoing is of more or less usual construction for cultivating both sides of a crop row simultaneously. Loosely connected to the tongue by a reach 5 is the implement support or yoke 6 informed somewhat like an inverted U and provided with two arms 7. The reach is pivotally connected at 8 to the tongue bracket 9, this constituting the connection to the tongue, it being understood that the reach is made in two parts, somewhat V shaped, with its forward end connected to the bracket. The rearward end of the reach is connected to the yoke 6.

Attached, one to each side of the frame, are two levers 10 which are each connected by a link 11 to a bracket 12 of the yoke 6. The levers are designed to raise the yoke, or lower the yoke or one side or the other thereof in accordance as one or the other or both are operated as the case may be. This permits the yoke to be held level, or one side raised, and the other lowered, the loose pivotal connection to bracket 9 permitting this. The lower ends of the arms 7 terminate in a bored seat in which seat the spindles 13 of the tool support members 14. The tool support members 14 are inverted V shape constituting two downward arms 15 and 16. A lever 17 is connected to the upper end of each spindle 13 and provides means for reversing the tool support member with regard to the arm 7. The lower end of the arms 15 of the tool support is provided with a bearing horizontally arranged within which is journaled a spindle or shaft connecting the two disks 18. These are arranged one each side of said arm. The lower end of the arm 16 is provided with a vertical bore in which seats the upper end of the shovel support spindle 19, the upper end projecting somewhat and provided with a lever 20 by means of which it may be turned within the arm through one hundred eighty degrees, or in other words its position may be reversed.

The shovel support member is provided with a bracket 21. In connection therewith there is provided a shovel 22 which may be any preferred or suitable type of cultivator or earth scarifier blade, the term shovel being an arbitrary term to denote the instrument. Shovel 22 has a curved shank 23 and an earth engaging portion 24 and a bifurcate upper portion 25 embracing each side of bracket 21 and secured thereto pivotally by pin 26. The bifurcate portion has an arcuate slot 27 which received a bolt passing through bracket, which bolt when the nut thereon is tightened holds the shovel from tipping upon the pin 26. However by loosening such nut the shovel may be tipped back and forth within the limitation of the length of such slot. This provides means for positioning the shovel at a desired angle for engagement with the earth.

It is contemplated that the present implement shall be employed in cultivating rows of growing crops such as corn for instance. In its employment the implement is driven with the main frame 1 straddling a row. If it is desired to employ the shovel next to the row for the purpose of breaking the soil, tearing or cutting weeds, the handles 17 are manipulated to rotate the tool support 16 to position the shovel 22 proximate the row, the lever 20 being employed to turn the shovel spindle to cause the shovel to face in the proper direction. Thereafter the implement is caused to travel along the row the shovel functioning as required. The disks 18 being removed from the row engage the soil remotely from the row, cutting weeds which lie across their travel.

When it is desired to operate the disks proximate the row, the tool support is reversed by means of the lever 17 turning the spindle 13 of the support 14, at the same time the shovel is reversed in order that it may be pointed in the proper direction. The disks 18, as the implement travels along will operate proximate the crop row turning the soil, while the shovel 22 will operate remotely therefrom.

Figure 2:
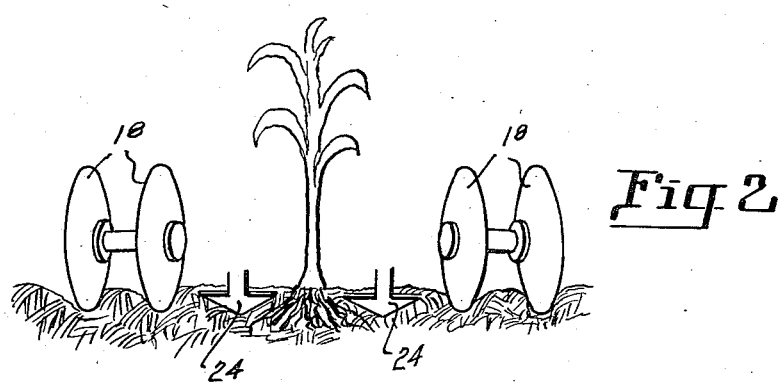
Figures 2 and 3 are diagrammatic views explaining the operation of the invention.
Figure 3:
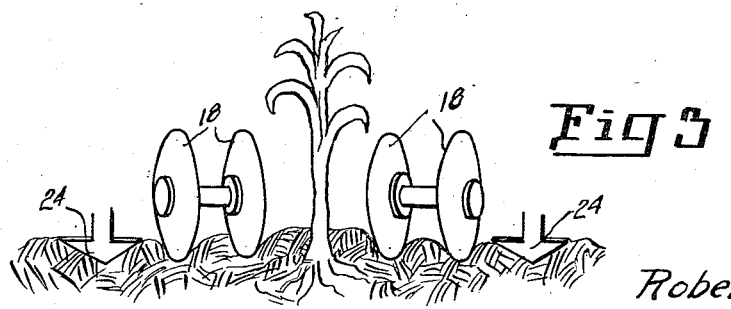

Figures 2 and 3 show the operation of the implement. In the first view the shovel is operating proximate the crop row, while in the second view, Figure 3, the disks are operating proximate the row. The implement may be operated to throw dirt to the row and tear up ridges between rows, or throw dirt and weeds to center between rows while the shovel loosens dirt next to row and covers grass and weeds, the disk to cut vines and throw them to center permitting shovels to loosen dirt around row, and other operations which will readily be apparent upon examination of the implement.

While a specific form of the improvement has been described and illustrated herein, it is desired to be understood that the same may be varied, within the scope of the appended claims, without departing from the spirit of the invention.

Having described my invention, I claim:—

1. In an agricultural implement of the class specified, a wheeled frame adapted to straddle a row, a member adjustable to raising, lowering and inclination carried thereby, a tool supporting member carried at each side thereof and spaced from each other to travel each side of the row, a disk and a shovel carried by each tool supporting member, the tool supporting members having a limited rotative adjustment upon a vertical axis in order to alter the positions of the disks and shovels relative to the row, and the shovels having a limited rotative movement upon a vertical axis in order to position the shovels in operative positions.

2. In an agricultural implement of the class specified, a wheeled frame adapted for straddling a crop row, a pair of tool supporting members, one carried at each side of the frame and each spaced from the other to travel one each side of the row, a disk and a shovel carried by each tool supporting member, the tool supporting members having a limited rotative adjustment upon a vertical axis in order to alter the positions of the disks and shovels relative to the row, and the shovels having a limited rotative movement upon a vertical axis in order to position the shovels in operative positions.

3. The invention as set forth in claim 2 including construction providing for the vertical adjustment of the tool supporting members.

ROBERT H. SMITH.